United States Patent [19]
Katz

[11] Patent Number: 5,680,769
[45] Date of Patent: Oct. 28, 1997

[54] SYSTEM FOR PREPARING FROZEN YOGURT AND ICE CREAM AND APPARATUS FOR SAME

[76] Inventor: Avraham Katz, 26 Ben-Zvi Street, Petah-Tikva, Israel

[21] Appl. No.: 594,580

[22] Filed: Jan. 31, 1996

[30] Foreign Application Priority Data

Jan. 4, 1996 [IL] Israel ......................................... 116679

[51] Int. Cl.⁶ ............................................ A23G 9/12
[52] U.S. Cl. ............................ 62/68; 62/258; 62/342
[58] Field of Search ........................ 62/258, 342, 343, 62/68

[56] References Cited

U.S. PATENT DOCUMENTS

| | | | |
|---|---|---|---|
| 1,610,626 | 12/1926 | Smith | 62/258 |
| 2,599,021 | 6/1952 | Se Bastian | 62/343 |
| 2,608,833 | 9/1952 | Woodruff | 62/343 |
| 3,626,709 | 12/1971 | Yuza | 62/343 |
| 3,797,268 | 3/1974 | Garavelli | 62/258 |
| 3,952,538 | 4/1976 | Warlick | 62/342 |
| 4,441,334 | 4/1984 | Cipelletti | 62/258 |
| 4,974,965 | 12/1990 | Heinhold | 62/342 |
| 5,022,315 | 6/1991 | Bertram et al. | 62/342 |
| 5,117,649 | 6/1992 | Mangini et al. | 62/258 |

*Primary Examiner*—William E. Tapolcai
*Attorney, Agent, or Firm*—Harness, Dickey & Pierce, P.L.C.

[57] ABSTRACT

A system for commercially making and dispensing individual portions of freshly perpared frozen yogurt or ice cream comprising providing a battery of miniature batch type ice cream making machines having containers with capacities of up to 800 mL, refrigeration means for cooling the containers to desired temperatures for making frozen yogurt or ice cream, yogurt or ice cream mix, and flavor concentrates, whereby separate individual portions of freshly prepared frozen yogurt or ice cream can be prepared simultaneously for serving to a number of customers by introducing separate individual portions of frozen yogurt or ice cream mix and flavor concentrates into the containers, activating the ice cream making machines for the required time and scooping up the individual portions of frozen yogurt or ice cream for serving to customers.

29 Claims, 2 Drawing Sheets

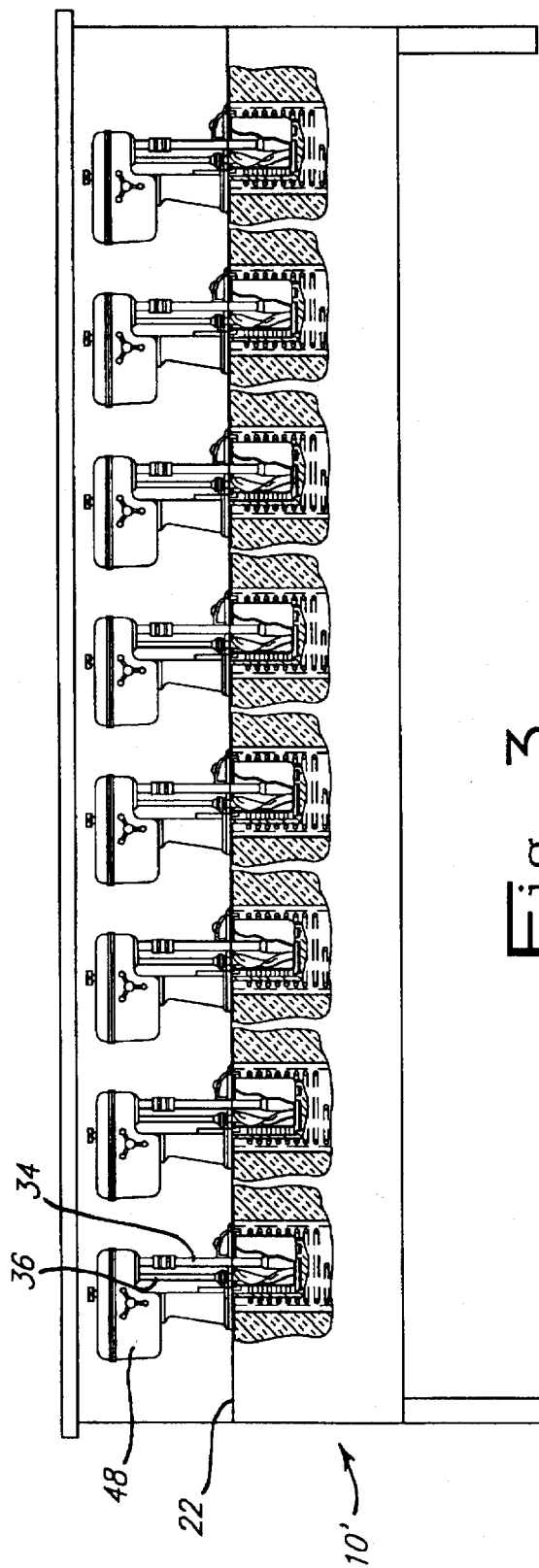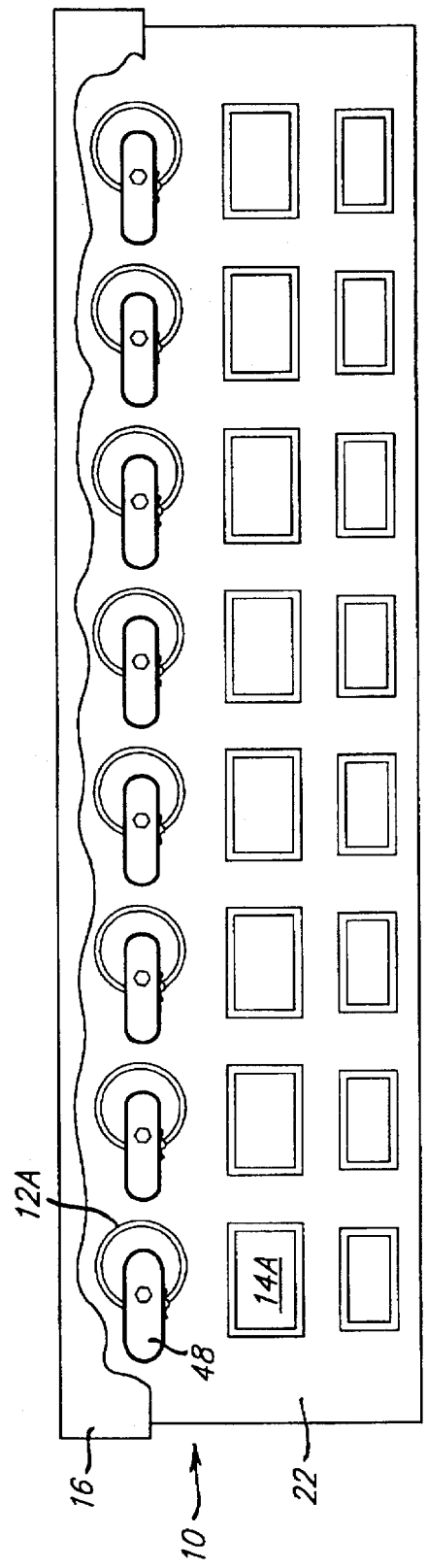

SYSTEM FOR PREPARING FROZEN YOGURT AND ICE CREAM AND APPARATUS FOR SAME

FIELD OF THE INVENTION

The present invention relates to a system and apparatus for preparing and dispensing frozen yogurt and ice cream on a commercial scale in the form of fresh individually prepared portions for consumption shortly after preparation. The system is most suitable for use in an ice cream parlour or shop to provide freshly prepared individual portions of frozen yogurt or ice cream of any desired flavour.

Ices based on frozen water were known in the Roman Empire and Marco Polo is supposed to have brought a recipe for milk ices from the Far East. Commercial production of ice cream became successful after the discovery that salt mixed with ice produces a lower temperature than ice alone. The introduction of mechanical refrigeration in the late 19th century greatly assisted the growth of the ice cream industry.

Commercial manufacture of ice cream involves several phases, each of which contributes to the quality of the product. These phases include pasteurization, homogenization, whipping and controlled freezing. Essentially ice cream is the product of a pasteurized, homogenized, milk fat composition, which is whipped in the presence of air and frozen simultaneously at a controlled temperature.

The basic ingredients in ice cream consist of milk or vegetable fat, non-fat milk or vegetable solids, sweetener such as sugar, stabilizer and/or emulsifier. These are pasteurized and homogenized together into what is called an ice cream "mix". To make ice cream, the mix is placed in a container such as a cylinder provided with a scraper. The cylinder and scraper are rotated in opposite directions in the presence of air and undergo cooling, so that the mix gets whipped. The scraper scrapes the mix from the wall of the container and forces it back into the middle, while air is constantly being whipped into the freezing composition. To the basic ice cream mix there is usually added either before or during freezing, some flavouring, colouring and/or pieces of fruit and/or nuts. The amount of air incorporated into the freezing mixture is defined in terms of overrun, that is to say, for example, if the volume of the mixture is doubled by the introduction of air, the composition has a 100% overrun. Generally, ice cream has an overrun of 70–110%. The scraper, by removing the ice cream from the walls and pushing it to the middle of the container, aids in the whipping process. The freezing temperature for preparing ice cream is generally about –4° C. Freshly prepared ice cream has about one third to one half of its water content in the form of ice, while upon storage, about 90% of the water converts to ice. Ice cream is therefore most palatable when it is consumed just as it comes from the ice cream machine that prepares it. However, ice cream is generally sold as hardened ice cream which was previously prepared and deep frozen for storage and which has lost much of its fresh texture and, therefore, palatability. There are of course ice cream machines that produce continuous ice cream or custard which are dispensed as single portions individually as ordered from a spigot in the machine. These machines, however, are relatively large, and each machine is able to provide only a single flavour ice cream. Thus, in order to provide a variety of flavours, one would have to install one machine for each flavour, which would occupy substantial space and is impractical for conventional ice cream parlours or shops. Therefore, ice cream shops offering many flavours in single individual portions operate by having many containers of differently flavoured hard ice cream, previously prepared and refrigerated. Ice cream orders are scooped out from the particular container having the specific flavour requested. This ice cream of course is the standard bulk ice cream which has lost much of its creaminess and palatability.

Frozen yogurt is also prepared as individual portions from frozen bulk yogurt which already has crystalline water in it. This affects the taste and texture, which is never as good as when fresh and creamy.

SUMMARY OF THE INVENTION

It is an object of the present invention to provide a commercial system for instantly making and dispensing multiple single portions of fresh frozen yogurt or ice cream as ordered.

Another object of the present invention is to provide a commercial system for instantly making and dispensing multiple single portions of freshly prepared frozen yogurt or ice cream with apparatus contained in a relatively small area suitable for an ice cream parlour.

Yet another object of the invention is to provide a commercial system for instantly making and dispensing single portions of freshly prepared frozen yogurt or ice cream in as many flavours as one desires.

Still another object of the present invention is to provide an apparatus for making multiple single portions of fresh frozen yogurt or ice cream for immediate dispensing to customers in as many different flavours as desired by the customers, the apparatus occupying limited space.

In accordance with this invention there is provided an apparatus comprising a battery of at least three, and preferably at least eight, miniature ice cream making machines on or in a counter, each of said ice cream making machines comprising a rotatable container having a capacity of up to 800 ml, and preferably no more than 500 ml for preparing single individual portions of ice cream or frozen yogurt and further comprising fixed or rotating scraper blades. The apparatus of this invention is thus suitable for making simultaneously many single batch portions of ice cream in a manner that batch ice cream is made in larger equipment, the difference being that in the present invention, many ice cream machines are provided in a single apparatus where the ice cream making machines are miniaturized for preparing only single portions which are not intended for storage but for immediate dispensing and consumption. Furthermore, the battery of ice cream machines can make use of a simple freezing counter into which the containers are placed without requiring each container to have its individual cooling mantle. In such case, the refrigerated counter has apertures into which the containers are inserted. A mechanism is provided for the containers to be rotated either from their bottoms within the refrigerated counter, or from above the counter via a motor turning a shaft connected to the centre of the container. The scraper may be fixed or it may be a rotating scraper, which may be a flat edge or a spiral scraper and is preferably operated from above. The refrigerated counter may also provide additional apertures for holding trays containing flavours, fruits, nuts and/or chocolate chips, for adding to the basic ice cream mix to give the particular flavour desired. Fresh frozen yogurt is prepared in the same apparatus.

BRIEF DESCRIPTION OF THE DRAWINGS

The present invention will be further understood from the following detailed description taken in conjunction with the drawings, in which

FIG. 3 is a cross-sectional view of an apparatus according to the invention; and FIG. 4 is a top view of an apparatus of FIG. 3.

Referring now to FIG. 1, there is shown a refrigerated counter table 10 with a counter top 22 having seven circular apertures 12A–12G and fourteen rectangular and round apertures 14A–14N. The refrigerated counter may have an elevated counter section 16 which may further have troughs 18 or apertures 20 for holding trays or containers that do not require refrigeration. The apertures 12A–12G will each hold an ice cream making container (not shown) comprised of stainless steel, with a motor (not shown) mounted on the counter 10 having means for rotating the container and a scraper blade in opposite directions. The ice cream making container is generally inserted into the apertures 12A–12G, with only the top lip of the container being above the surface of the counter top. The counter table 10 contains refrigeration means as in known in the art. This may consist of a glycol-water mixture through which a refirgerant is circulated by means of tubing inside the table, thus maintaining the desired temperature for making the ice cream. The bottom of the stainless steel container rests within the refrigerant and therefore whipping the ice cream mix in the container will form ice cream. The rectangular and round apertures 14A–14N are for holding trays with flavours, colours, syrups, fruits, nuts and/or chocolate chips, which are preferably held at cool temperatures. Suitable dispensing means such as scoops, spatulas or spoons are also provided for these trays.

Figure 1:
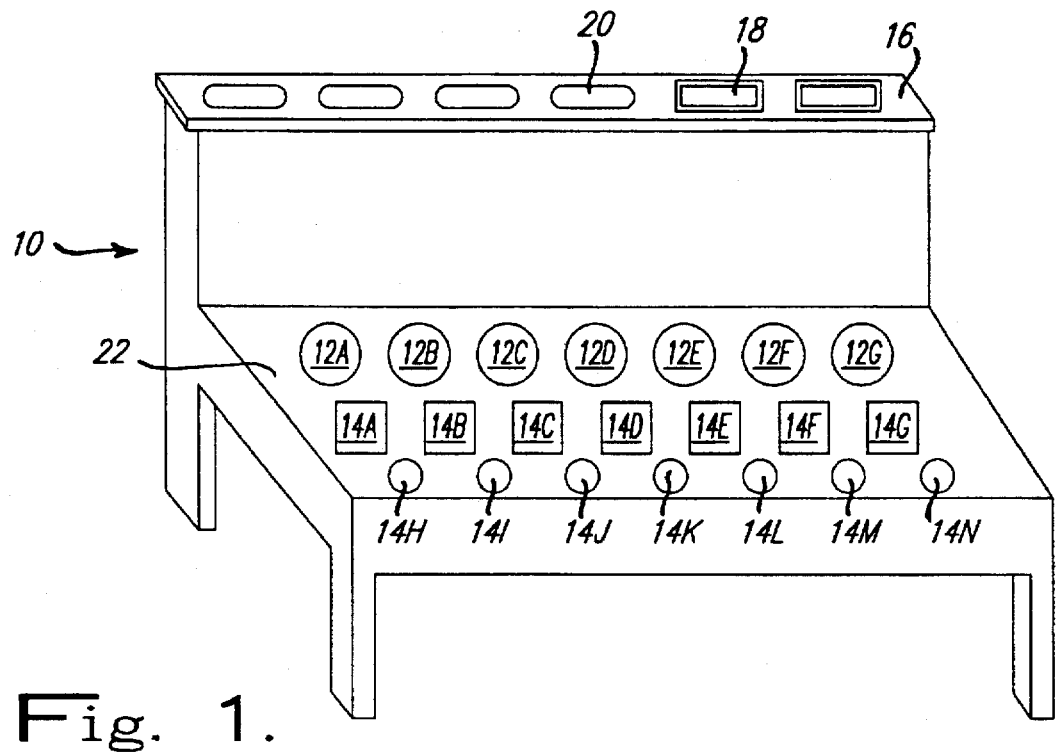
FIG. 1 is a perspective view of a refrigerated counter for use in the present invention.
Figure 2:
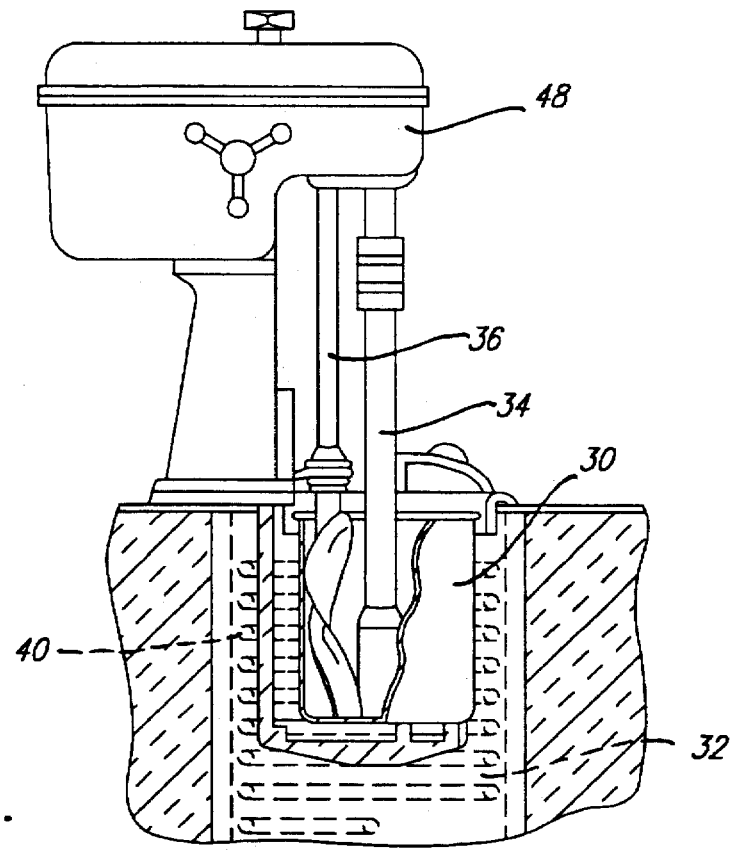
FIG. 2 is a cross-sectional view of a miniature mantled ice cream making machine for use in an apparatus according to the invention.

Alternatively, the ice cream machine may comprise a container 30, as shown in FIG. 2, that has its own individual freezing mantle 32, so that the counter table 10 does not have to be referigerated itself. The combined mantles 32 of the battery of containers 30 in apertures 12A–12G provide sufficient cooling to maintain the desirable temperature for the flavours, fruits and other ingredients contained in the trays 14A–14N. Each of the ice cream making containers can thus be designated for a specific flavour of ice cream, so that the container does not have to be washed out and cleaned in order to prepare the next order of that particular flavour, since any residual ice cream left is insufficient to interfere with the taste, texture or palatability of the next portion that is prepared therein. It is of course possible to designate several containers for the same flavour. This, however, would depend on the relative distribution of the flavours as requested by customers. It is very likely that there will be more ice cream containers designated for making chocolate and vanilla flavoured ice cream than, for example, pistacchio or peach ice cream.

FIGS. 3 and 4 illustrate an apparatus with a counter table 10' having an upper surface 22 in which are disposed ice cream making containers 30. These containers 30 are shown inserted in apertures 12. A motor 48 (see also FIG. 2) mounted on the counter surface 22 rotates a shaft 34 attached to the bottom of the container 30. A rotating scraper blade 36 is shown attached to motor 48 for rotating in the opposite direction. Alternatively, a fixed scraper blade may be used and might even be preferable, simplifying the apparatus. Such a fixed scraper would preferably be a flat blade type. As can be seen, the container 30 is surrounded by a mantle 32 containing spiral tubes 40 through which refrigerating gas or liquid circulates to provide cooling to the container 30 while the ice cream is being prepared.

The system operates as follows. An ice cream or yogurt mix, which is prepared conventionally in a separate apparatus, is dispensed in a quantity for preparing a single portion in the order of 100–250 ml into the refrigerated miniature ice cream making container. A quantity of the desired flavour extract and/or fruit, nuts, chocolate etc. are added thereto. The container is then rotated, causing the yogurt or ice cream mix and flavour to be whipped together with air by means of the scraper which forces the yogurt or ice cream to the middle of the container, while being cooled to a temperature suitable for creating ice cream. This rotating-whipping procedure takes about two to three minutes and provides very fresh frozen yogurt or ice cream having a delicious creamy texture and taste unobtainable from stored frozen yogurt or ice cream.

The apparatus can also be used to prepare fresh frozen yogurt or ice cream from a powder mix and water and not only from a liquid ice cream mix.

It will be appreciated by those skilled in the art that the invention is not limited to what has been shown and described hereinabove by way of example. Rather, the scope of the invention is defined solely by the claims which follow.

I claim:

1. A system for commercially making and dispensing separate multiple individual portions of freshly prepared frozen yogurt or ice cream for immediate serving to a number of customers comprising:

providing a battery of miniature batch type ice cream making machines comprising open rotating containers provided with scraper means and having capacities of 800 ml or less, cooling said containers to desired temperatures for making frozen yogurt or ice cream, frozen yogurt or ice cream mix, flavour concentrates, introducing separate individual portions of up to 250 ml frozen yogurt or ice cream mix and flavour concentrates into respective containers, rotating and cooling said containers for a required time, and scooping up the individual portions of frozen yogurt or ice cream from the open rotating containers for serving to customers.

2. A method as in claim 1, which in addition to flavour concentrates comprises fruits, nuts and/or chocolate chips.

3. A method as in claim 1, comprising a battery of at least eight ice cream making machines.

4. A method as in claim 1, wherein the battery of ice cream making machines are positioned on or in a counter table.

5. A system as in claim 4, wherein the counter table provides the refrigeration means.

6. A method as in claim 4, wherein the counter table also comprises compartments for holding flavour concentrates, fruits, nuts and/or chocolate chips.

7. A method as in claim 1, wherein the containers have a capacity no greater than 500 ml.

8. A method as in claim 1, wherein said ice cream making machines have fixed scrapers.

9. A method as in claim 2, wherein the battery of ice cream making machines are positioned on or in a counter table.

10. A method as in claim 4, wherein the containers have a capacity no greater than 500 ml.

11. A method as in claim 6, wherein the containers have a capacity no greater than 500 ml.

12. A method as in claim 4, wherein said ice cream making machines have fixed scrapers.

13. A method as in claim 6, wherein said ice cream making machines have fixed scrapers.

14. A method as in claim 7, wherein said ice cream making machines have fixed scrapers.

15. An apparatus for simultaneously making multiple separate individual portions of fresh frozen yogurt or ice cream for immediate serving comprising:

a counter table containing, a battery of at least three miniature batch type ice cream making machines comprising open rotating containers provided with scraper means, each container having a capacity of 800 ml or less, to accommodate up to 250 ml ice cream mix, and means for refrigerating said rotating containers sufficiently to produce in each container individual portions of ice cream for dispensing from the open rotating container.

16. An apparatus as in claim 15 comprising a battery of at least 8 miniature ice cream making machines.

17. An apparatus as in claim 15, wherein said means for refrigerating comprises a refrigerant contained inside said counter table.

18. An apparatus as in claim 15, wherein said means for refrigerating comprises individual refrigeration mantles for each of said container.

19. An apparatus as in claim 15, and also comprising means for holding ice cream mix additives such as flavours, concentrates, fruits, nuts and/or chocolate chips.

20. An apparatus as in claim 15, wherein the containers have a capacity no greater than 500 ml.

21. An apparatus as in claim 15, wherein said ice cream making machines have fixed scrapers.

22. An apparatus as in claim 17, wherein said means for refrigerating comprises individual refrigeration mantles for each of said container.

23. An apparatus as in claim 17, and also comprising means for holding ice cream mix additives such as flavours, concentrates, fruits, nuts and/or chocolate chips.

24. An apparatus as in claim 18, and also comprising means for holding ice cream mix additives such as flavours, concentrates, fruits, nuts and/or chocolate chips.

25. An apparatus as in claim 17, wherein the containers have a capacity no greater than 500 ml.

26. An apparatus as in claim 18, wherein the containers have a capacity no greater than 500 ml.

27. An apparatus as in claim 17, wherein said ice cream making machines have fixed scrapers.

28. An apparatus as in claim 18, wherein said ice cream making machines have fixed scrapers.

29. An apparatus as in claim 20, wherein said ice cream making machines have fixed scrapers.

* * * * *

UNITED STATES PATENT AND TRADEMARK OFFICE
CERTIFICATE OF CORRECTION

PATENT NO.   : 5,680,769
DATED        : October 28, 1997
INVENTOR(S)  : Avraham Katz It is certified that error appears in the above-identified patent and that said Letters Patent is hereby corrected as shown below:

The title page, should be deleted to appear as per attached title page.

United States Patent [19]

Katz

[11] Patent Number: 5,680,769

[45] Date of Patent: Oct. 28, 1997

[54] SYSTEM FOR PREPARING FROZEN YOGURT AND ICE CREAM AND APPARATUS FOR SAME

[76] Inventor: Avraham Katz, 26 Ben-Zvi Street, Petah-Tikva, Israel

[21] Appl. No.: 594,580

[22] Filed: Jan. 31, 1996

[30] Foreign Application Priority Data

Jan. 4, 1996 [IL] Israel .................................. 116679

[51] Int. Cl.$^6$ .................................................. A23G 9/12
[52] U.S. Cl. ............................... 62/68; 62/258; 62/342
[58] Field of Search ........................... 62/258, 342, 343, 62/68

[56] References Cited

U.S. PATENT DOCUMENTS

| | | | |
|---|---|---|---|
| 1,610,626 | 12/1926 | Smith | 62/258 |
| 2,599,021 | 6/1952 | Se Bastian | 62/343 |
| 2,608,833 | 9/1952 | Woodruff | 62/343 |
| 3,626,709 | 12/1971 | Yuza | 62/343 |
| 3,797,268 | 3/1974 | Garavelli | 62/258 |
| 3,952,538 | 4/1976 | Warlick | 62/342 |
| 4,441,334 | 4/1984 | Cipelletti | 62/258 |
| 4,974,965 | 12/1990 | Heinhold | 62/342 |
| 5,022,315 | 6/1991 | Bertram et al. | 62/342 |
| 5,117,649 | 6/1992 | Mangini et al. | 62/258 |

*Primary Examiner*—William E. Tapolcai
*Attorney, Agent, or Firm*—Harness, Dickey & Pierce, P.L.C.

[57] ABSTRACT

A system for commercially making and dispensing individual portions of freshly perpared frozen yogurt or ice cream comprising providing a battery of miniature batch type ice cream making machines having containers with capacities of up to 800 mL, refrigeration means for cooling the containers to desired temperatures for making frozen yogurt or ice cream, yogurt or ice cream mix, and flavor concentrates, whereby separate individual portions of freshly prepared frozen yogurt or ice cream can be prepared simultaneously for serving to a number of customers by introducing separate individual portions of frozen yogurt or ice cream mix and flavor concentrates into the containers, activating the ice cream making machines for the required time and scooping up the individual portions of frozen yogurt or ice cream for serving to customers.

29 Claims, 2 Drawing Sheets

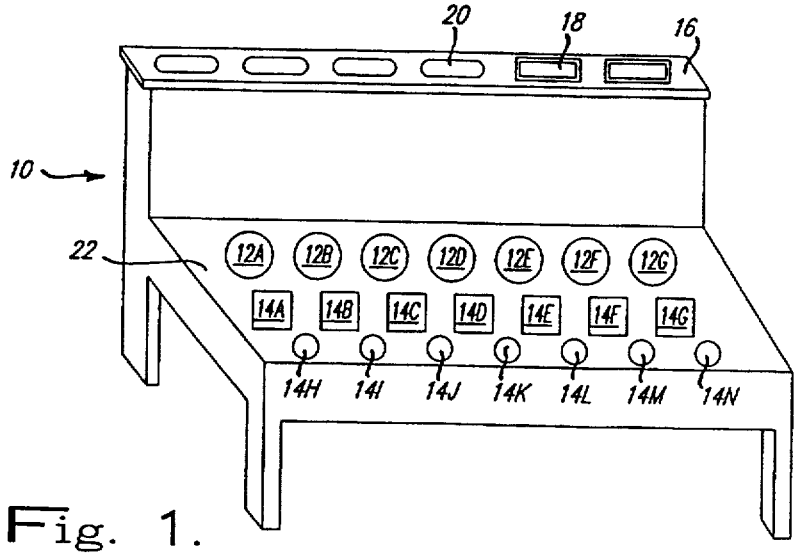

Fig. 1.

UNITED STATES PATENT AND TRADEMARK OFFICE
CERTIFICATE OF CORRECTION

PATENT NO. : 5,680,769
DATED : October 28, 1997
INVENTOR(S) : Avraham Katz

It is certified that error appears in the above-indentified patent and that said Letters Patent is hereby corrected as shown below:

Abstract, line 2, "perpared" should be --prepared--.

Column 3, line 24, (first occurrence), "in" should be --is--.

Column 3, line 25, "refirgerant" should be --refrigerant--.

Column 3, line 39, "referigerated" should be --refrigerated--.

Column 4, line 26, Claim 1, "system" should be --method--.

Column 4, line 53, Claim 6, "system" should be --method--.

Signed and Sealed this

Thirteenth Day of October 1998

Attest:

BRUCE LEHMAN

*Attesting Officer*  *Commissioner of Patents and Trademarks*